June 12, 1945.    G. F. TOWNER    2,378,259
BOMB CONTROL UNIT
Filed July 20, 1940    7 Sheets-Sheet 6
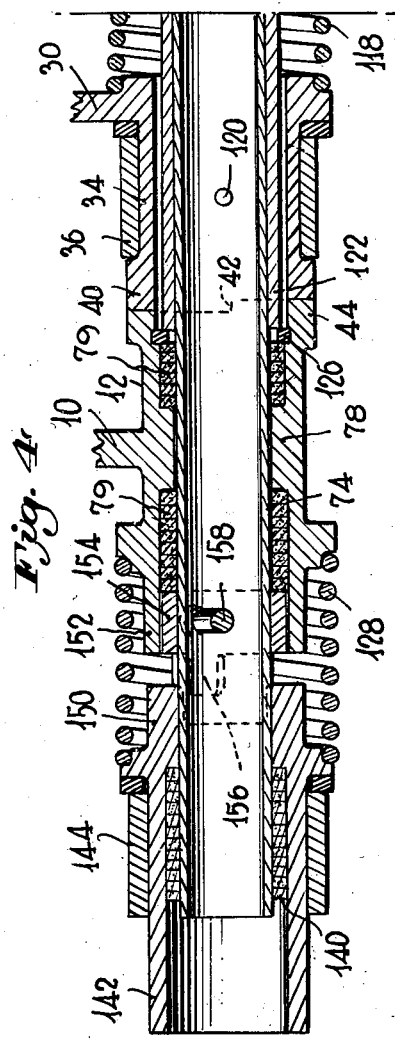
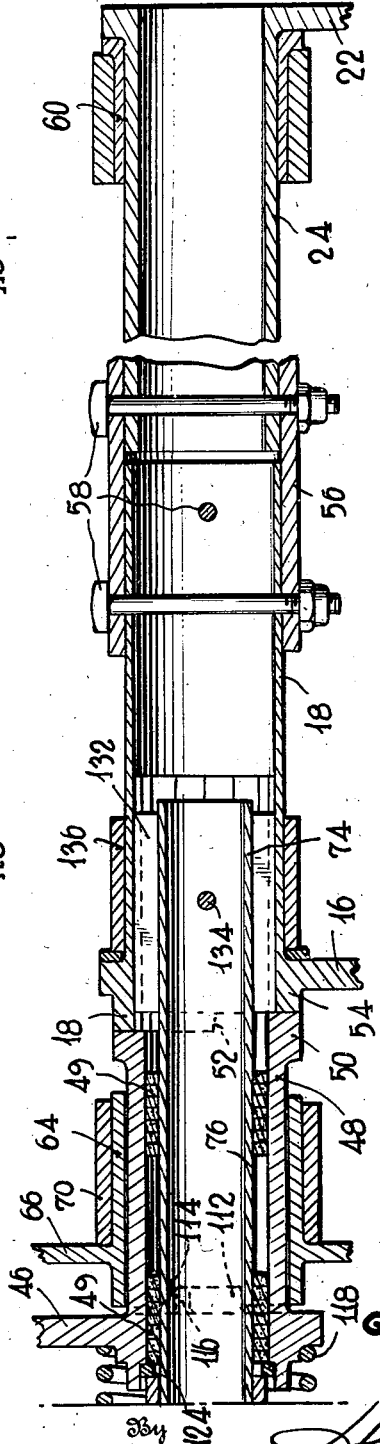
Inventor
George F. Towner
By
Attorney

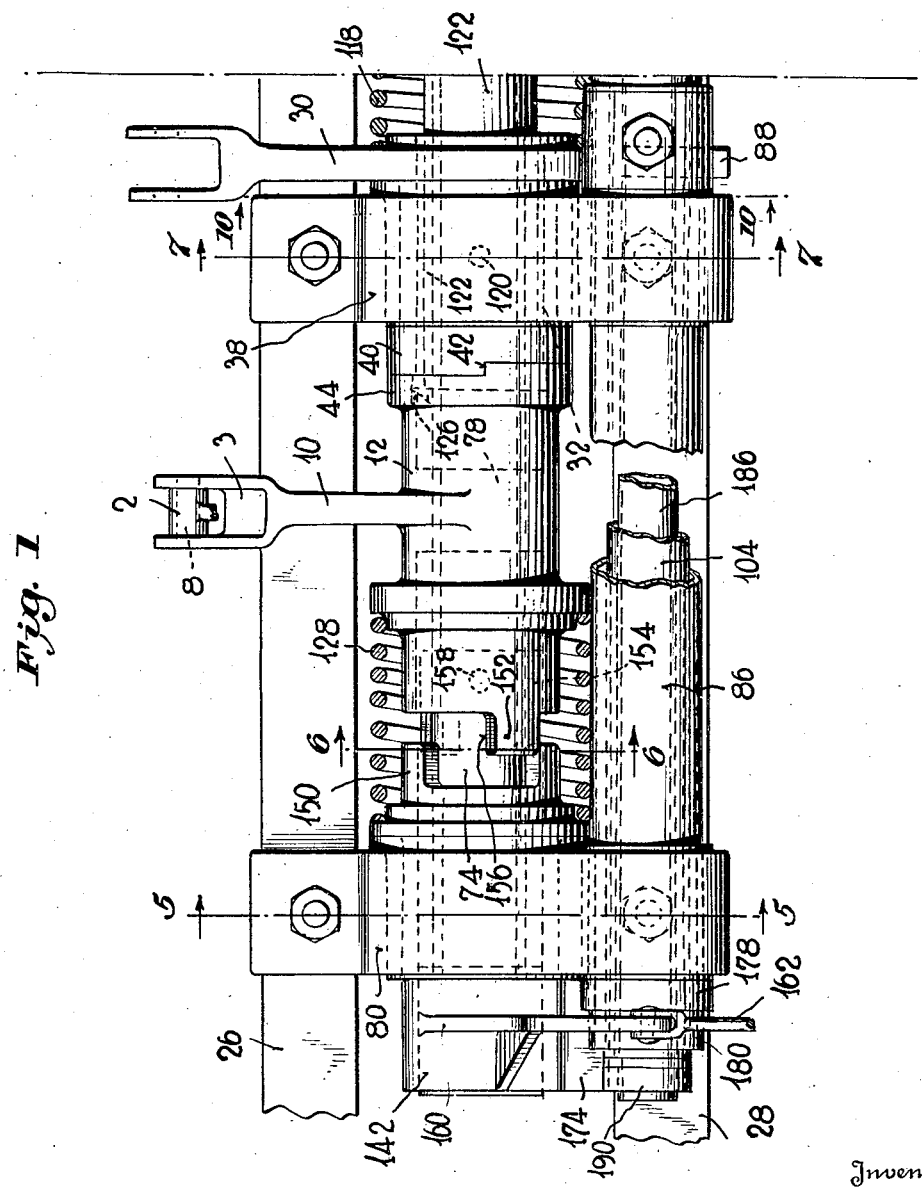

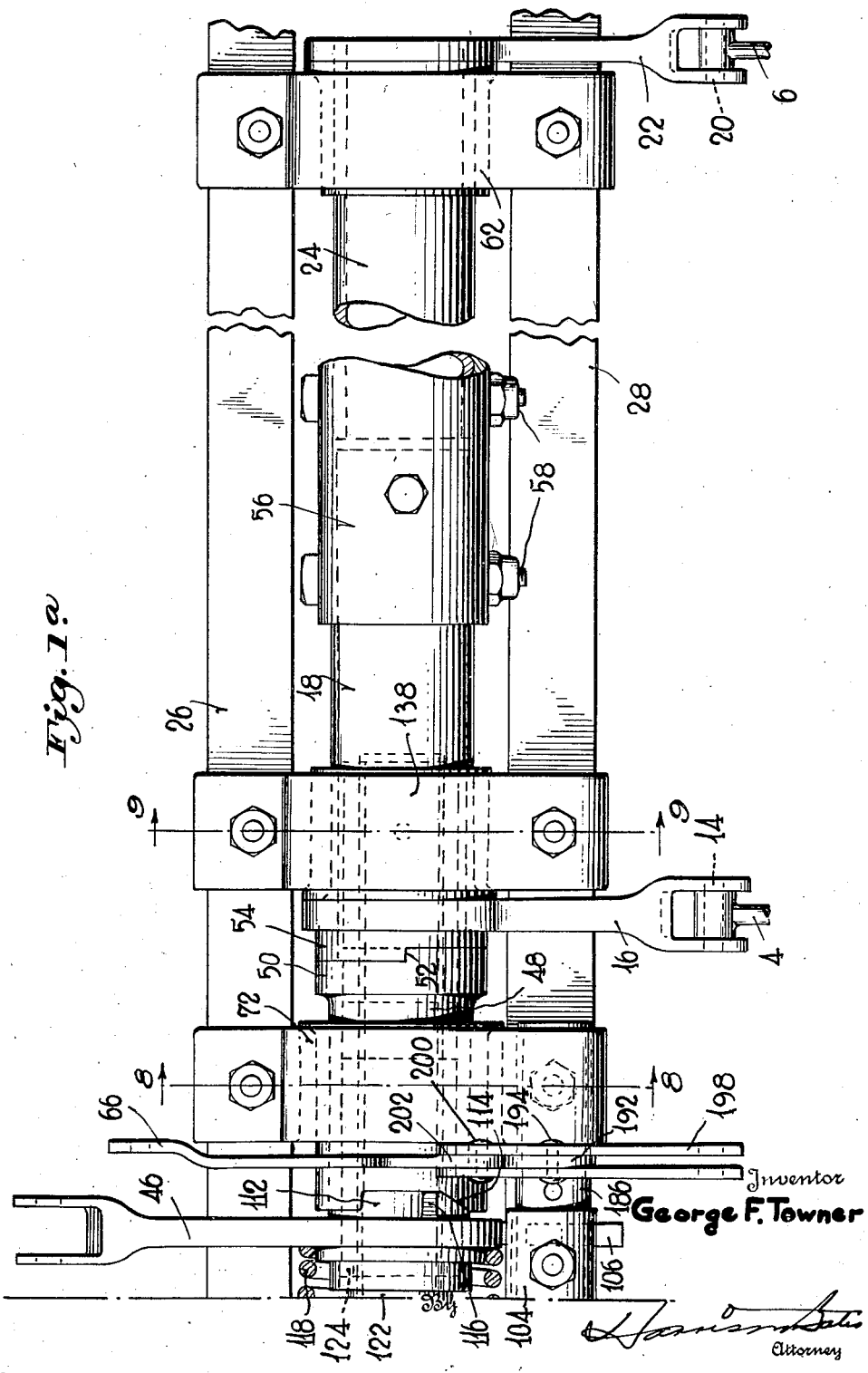

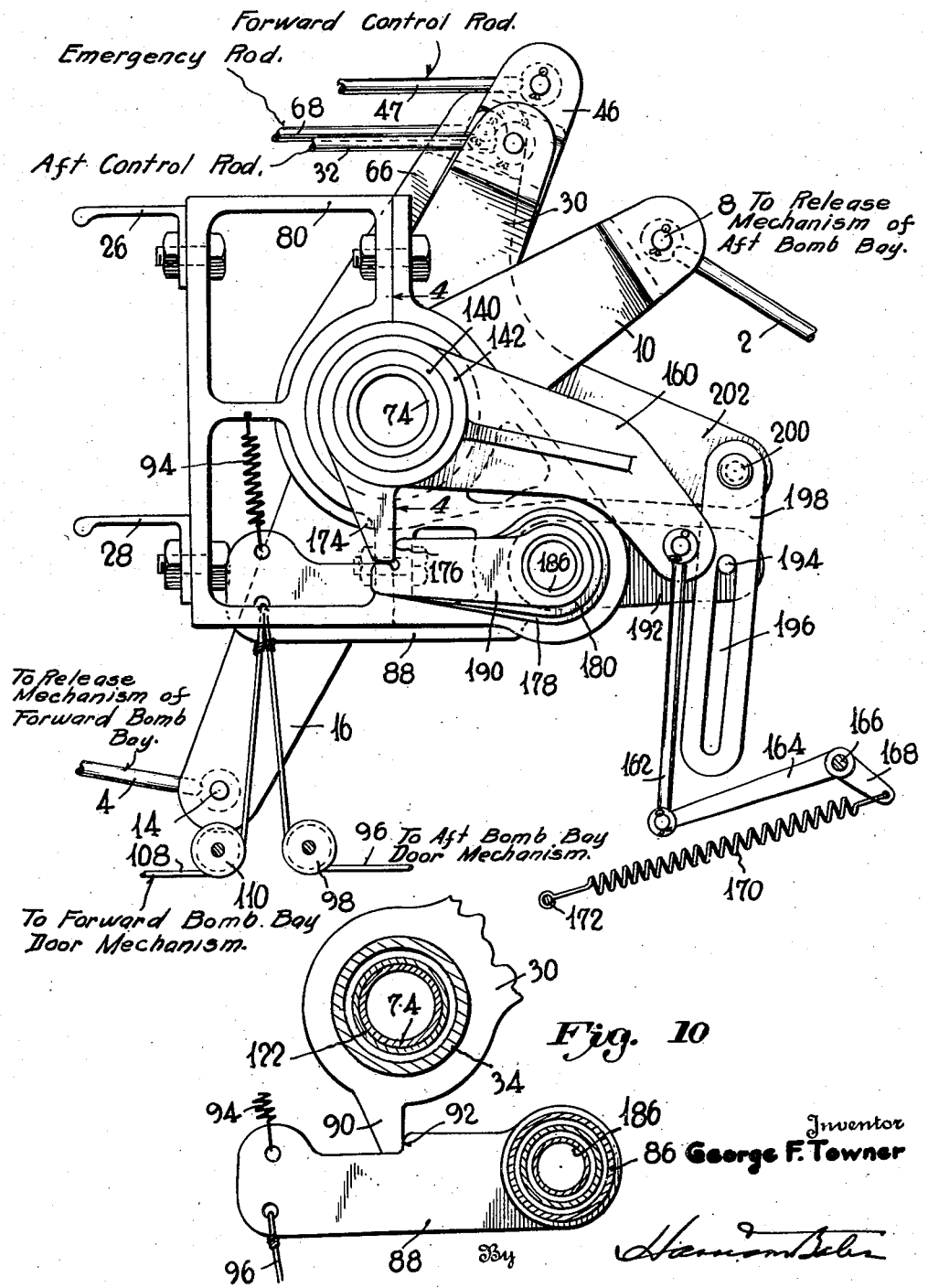

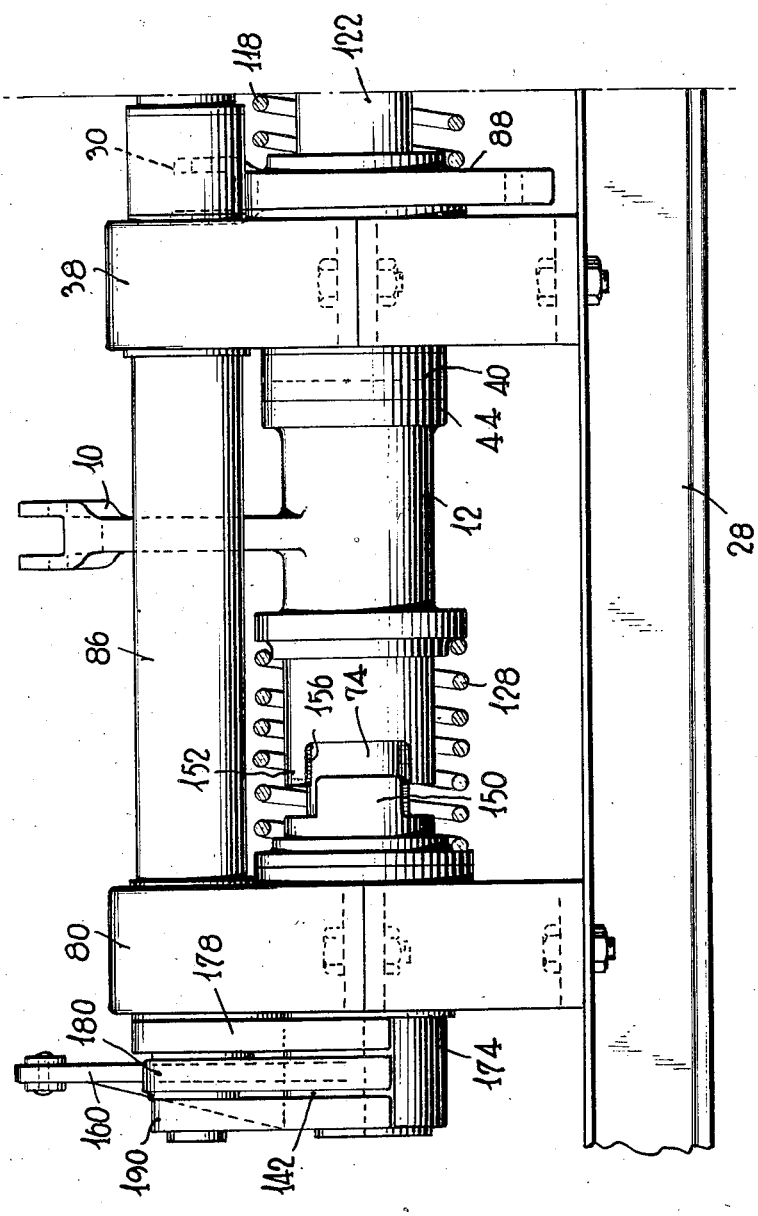

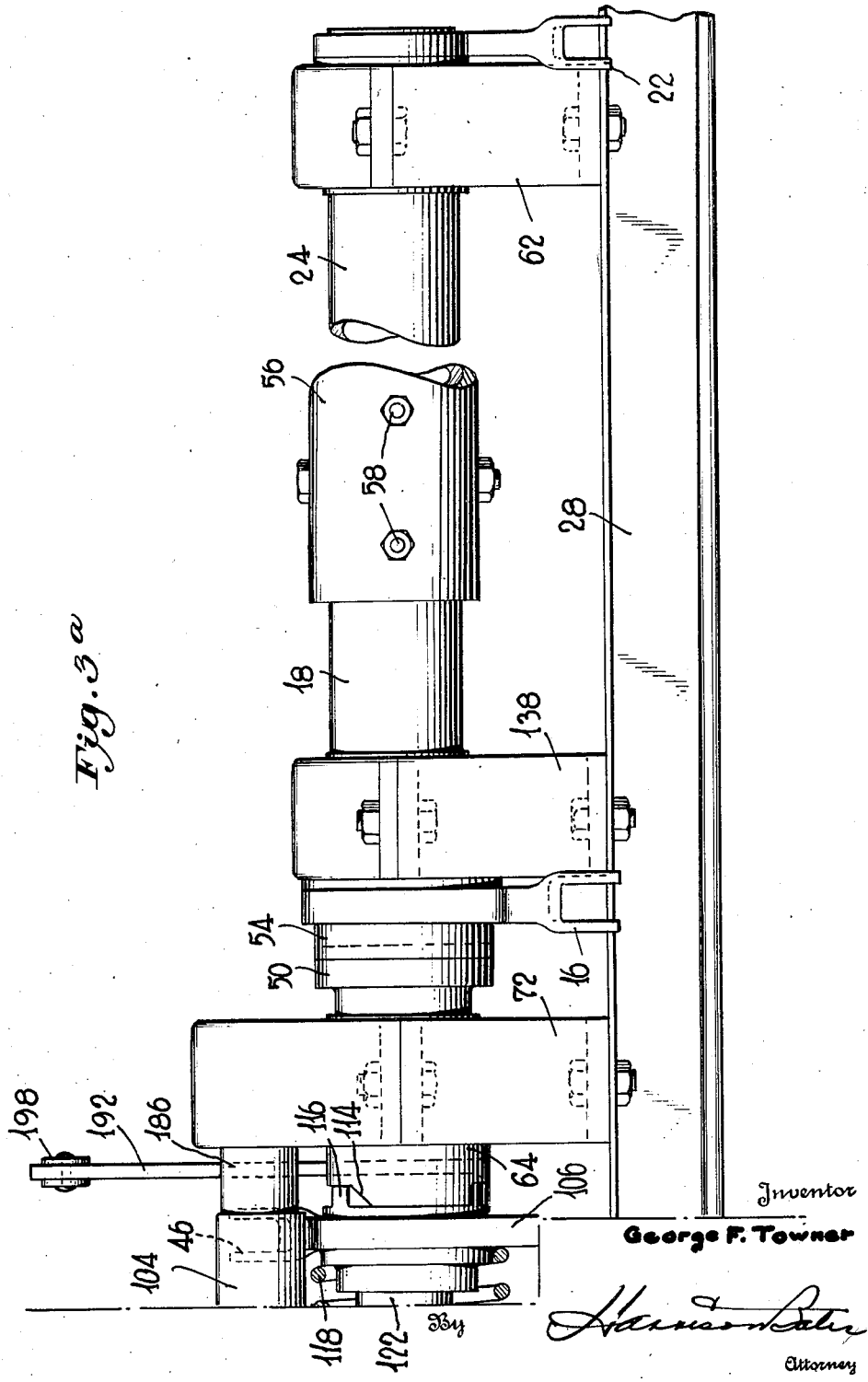

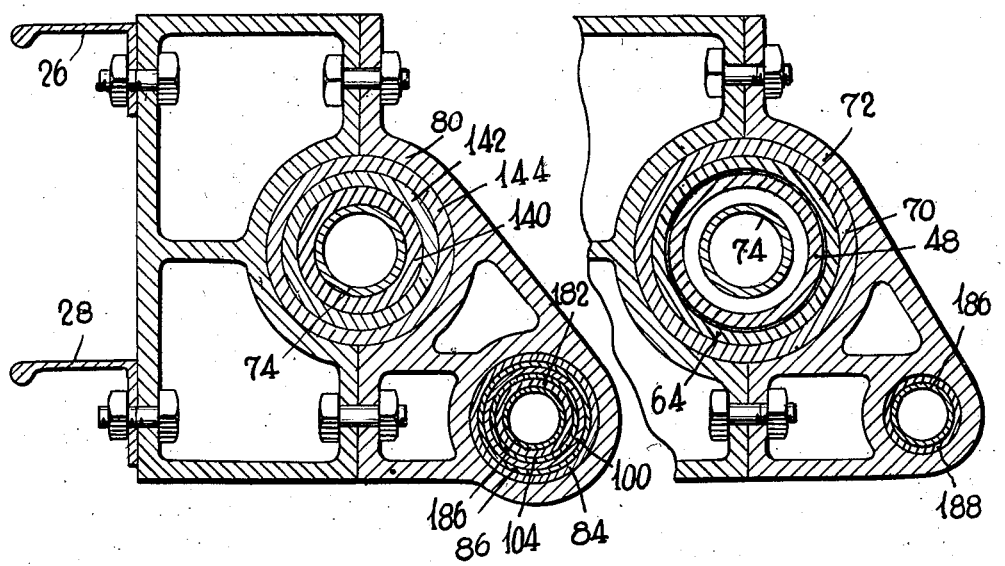
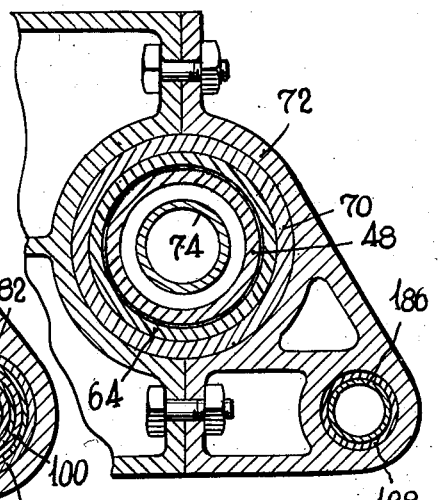
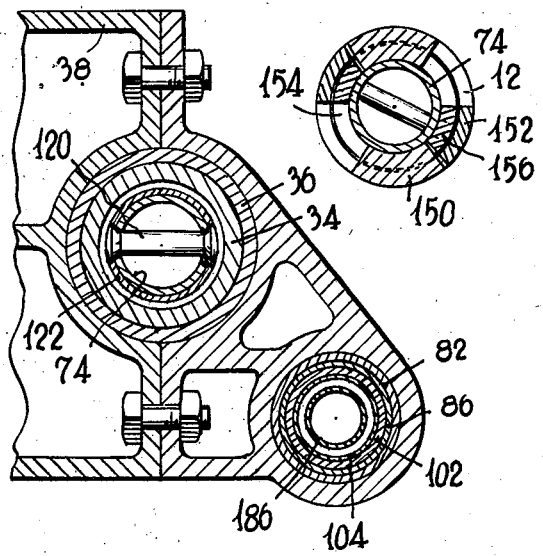
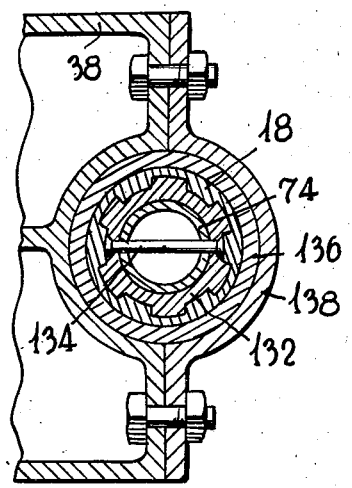
Inventor
George F. Towner

Patented June 12, 1945

2,378,259

UNITED STATES PATENT OFFICE 2,378,259

BOMB CONTROL UNIT

George F. Towner, Joppa, Md., assignor to The Glenn L. Martin Company, Baltimore, Md.

Application July 20, 1940, Serial No. 346,509

10 Claims. (Cl. 89—1.5)

The invention relates to bomb dropping control mechanism, and particularly to a safety and emergency control therefor.

In aircraft, several bombs are normally arranged in a rack in a bomb-bay. The bomb-bay is closed by doors. Such an arrangement presents the danger that the bombs may be released while the doors are still closed, which is dangerous to the aircraft.

Bomb release mechanisms for bomb racks and shackles usually include an arrangement settable to a plurality of positions. In one of these positions, the bombs are locked in the rack and the release mechanism cannot operate. In a second position, the bombs may be released individually from the rack as desired. In a third position, on the other hand, the bombs are all released simultaneously, or in salvo.

A primary object of the present invention is to provide an arrangement which will prevent the release of bombs from the racks in a bomb-bay until the doors of the bomb-bay are opened.

Still another object of the invention is to provide an arrangement of this type in which the setting mechanism for the bomb release mechanism is held in locked position until the bomb-bay doors are opened, so that no additional locking mechanism is required.

A further object of the invention is to provide a single mechanism which is useful for controlling bomb release mechanisms in a plurality of bomb-bays, releasing the bombs in each bomb-bay only after the doors thereof are opened.

Still a further object of the invention is to provide an emergency release mechanism, particularly for a plurality of bomb-bays, which will automatically set all of the parts to salvo position so as to release all of the bombs whenever the emergency release is operated, but which permits operation of the emergency release only when all of the bomb-bay doors are open. Thus when the bomb-bay doors are opened it is possible by operation of a single member to release mechanism which is automatically operated by suitable power to release all of the bombs from the aircraft.

Further objects and advantages of the invention will be seen from the following description, particularly when taken in conjunction with the accompanying drawings which form a part thereof.

In the drawings:

Fig. 1 shows in side elevation the left-hand portion of a bomb release control mechanism embodying the invention;

Fig. 1a is a similar view of the right-hand portion thereof;

Fig. 2 is an end view of the mechanism of Fig. 1;

Figs. 3 and 3a are the right and left-hand portions respectively of a bottom plan view of the mechanism of Figs. 1 and 1a;

Figs. 4 and 4a are vertical sections respectively of the mechanism of Figs. 1 and 1a, showing only the main shaft and the parts mounted thereon, substantially on the line 4—4 of Fig. 2;

Figs. 5, 6, 7 and 10 are cross sections on the lines 5—5, 6—6, 7—7 and 10—10 respectively of Fig. 1; and Figs. 8 and 9 are cross sections on the lines 8—8 and 9—9 respectively of Fig. 1a.

The mechanism as shown in the drawings by way of example is intended to be applied to an aircraft having a single aft bomb-bay and two forward bomb-bays. The doors and setting mechanisms of the two forward bomb-bays are arranged to be operated simultaneously.

In each bomb-bay there is a rack which may carry a set of bomb shackles with bomb releasing mechanism or a sling for a fuel tank. These shackles may be set either to a locked position which prevents the release of bombs; to a selective position in which the bombs may be released individually by operation of a suitable control; or to a salvo position in which all of the bombs in the rack are automatically released and dropped therefrom.

The parts as shown in the drawings are in a locked position. The release mechanism of the aft bomb-bay is controlled by a rod 2 (Fig. 2), while the release mechanisms of the forward bomb-bay are controlled by rods 4 and 6 respectively.

Aft release rod 2 is pivoted at 8 to a lever 10 which is integral with a sleeve 12 the mounting and arrangement of which will be described below. Rod 4 is pivoted at 14 to a lever 16 integral with a sleeve 18. Rod 6 is pivoted at 20 to an arm 22 rigid with a sleeve 24.

The sleeves 12, 18, and 24 form part of a main shaft mechanism. This mechanism is mounted on two longitudinally extending angle members or frame members 26 and 28. To the angle members 26 and 28 are connected a series of bearing supporting members for supporting the main shaft mechanism, as well as an auxiliary shaft mechanism.

For operating the aft bomb-bay control rod 2 and lever 10, through sleeve 12, I provide a lever 30 to one end of which is pivoted a rod 32 which extends to the bombardier's compartment. Arm 30 is integral with a sleeve 34 which is mounted to turn in a bearing 36 (see Fig. 7) in the bearing supporting member 38, this bearing supporting member being mounted on the angle members 26 and 28. At its left-hand side (Fig. 1) sleeve 34 has a clutch portion 40 provided with steps indicated at 42 (Fig. 1), which cooperate with steps in a mating clutch portion 44 on the sleeve 12. Thus whenever the lever 30 is turned the lever 10 will be moved in the same direction, assuming that, as is true under normal conditions, clutch members 40 and 44 are engaged. This movement may be either just sufficient to move rod 2 to set the bomb control release mechanism to selective position, or it may be sufficient to set the bomb control release mechanism to salvo position.

A lever 46 is provided for operating the forward bomb-bay control mechanisms, and is connected by a rod 47 pivoted to the end thereof to the bombardier's compartment. Lever 46 is integral with a sleeve 48 mounted in a manner to be described below. Sleeve 48 at its other end has a clutch portion 50 provided with shoulders 52 engageable with corresponding shoulders on a clutch portion 54 of sleeve 18 which carries lever 16. Thus under normal conditions the turning of lever 46 will also turn lever 16.

Sleeve 18 has an extending portion which is connected through a sleeve 56 and suitable bolts 58 to sleeve 24 with which lever 22 is integral. Sleeve 24 is mounted by a bearing 60 in the bearing member 62 mounted on the two angle members 26 and 28. Thus levers 16 and 22 and therefore control rods 4 and 6 move simultaneously to control both the forward bomb releasing mechanisms. The lever 46 and correspondingly levers 16 and 22 may also be moved from the position shown which corresponds to locking to either a selective or a salvo position.

Sleeve 48 is mounted for turning movement on two bearing 49 which are in turn supported by shaft 74, the mounting of which will be described below.

Sleeve 64 is mounted outside of, but not in contact with sleeve 48. Emergency release lever 66 is integral with sleeve 64, and the effect of operation of this lever, which is controlled by rod 68 extending to the pilot's compartment, will be described below.

Sleeve 64 is mounted for turning movement, and also for restriction of endwise movement, in a bearing 70, which is in turn mounted in bearing member 72 which is supported by angle members 26 and 28.

Extending through the central part of the main shaft arrangement is a tube or sleeve 74. This tube is turnably mounted in a manner to be described below.

Tube 74 extends through sleeve 12, and provides through bearings 79 a support for sleeve 12.

Normally of course, when the bomb-bay doors are not open, operation of levers 30 and 46 must be prevented. This is accomplished by a locking mechanism which is mounted principally on the auxiliary shaft structure now to be described and shown in the lower right-hand corner of Fig. 2.

Mounted in the bearing member 38 (Fig. 7) and in a bearing member 80 at the left-hand end of the mechanism of Fig. 1 (Fig. 5) by bearings 82 and 84 respectively is a sleeve 86. This sleeve carries opposite the aft control lever 30 a catch lever 88 (see Fig. 10). Lever 30 has a projecting nose 90 engageable against a shoulder 92 on lever 88, so that as long as such engagement occurs lever 30 cannot turn in the counterclockwise direction (Fig. 10). A coil spring 94 connected to a fixed portion of the mechanism normally holds lever 88 in locking position, or in a clockwise direction in Fig. 10.

Lever 88 is connected by cable 96 passing over a pulley 98 to the aft bomb-bay door mechanism in such a manner that when the bomb-bay door mechanism has operated to open the doors, cable 96 is pulled and moves lever 88 downward, thus releasing lever 30. Thereafter, when the control rod 32 is moved by the bombardier, the bomb release mechanism may be set either for selective or salvo position. Thus the operation of the mechanism is possible only after the aft bomb-bay doors are open.

Mounted within the sleeve 86 by bearings 100 and 102 respectively is a second sleeve 104. Opposite the lever 46 the sleeve 104 carries a lever 106 similar to lever 88 and having a shoulder cooperating with a projection on lever 46. Connected to lever 106 is a cable 108 which extends over a pulley 110 to the forward bomb-bay door mechanism. This lever is normally held up by a coil spring, and operates in the same manner as lever 88 to release lever 46 and the forward bomb control release mechanism only when the forward bomb-bay doors are open.

The above mechanism constitutes the normal portion of the structure. The emergency release mechanism will now be described. The purpose of this emergency release mechanism is to shift all of the bomb release mechanisms to salvo position and thereby to release the bombs when the emergency control rod 68 is moved to shift lever 66 counter-clockwise (Fig. 2), but to delay the operation of the bomb release mechanisms until all of the bomb-bay doors are open.

With respect to the main shaft mechanism, the emergency release lever 66 and its sleeve 64 merely serve for releasing the normal levers so that the power operated emergency mechanism can shift the parts to salvo position. Sleeve 64 has at its left-hand edge a cut-away portion 112 provided at one point with a cam surface 114. The hub of lever 46 is provided with a projecting portion 116 which extends into the space 112 and the free end of which is engageable with the cam surface 114. Sleeve 48 of lever 46 is longitudinally slidable with respect to the sleeve 64 and the bearing 70, but is normally held in the position shown by a coil spring 118 arranged between lever 46 and the hub of lever 30. This of course also urges lever 30 and sleeve 34 to the left (see Fig. 4). However, the hub of lever 30 rests against thrust bearing 36 inside bearing member 38 so that no longitudinal motion of lever 30 is possible.

The above construction permits lever 46 to turn counter-clockwise in Fig. 2, since projection 116 can move freely in space 112, the angle of free movement possible being sufficient to permit the setting of the rods 4 and 6 either to selective or to salvo position as desired. On the other hand, when the emergency lever 66 is turned counterclockwise in Fig. 2, or towards the back in Fig. 1a, the cam surface 114 immediately strikes the projection 116 and shifts the sleeve 48 to the left. Of course the effect of this is to move clutch portion 50 to the left, so that the engagement between members 50 and 54 is broken. The levers 16 and 22 are then free to turn regardless of the position of the lever 46.

Extending through the sleeve 34 of lever 30 and secured to the outside of sleeve 74 by a pin 120 is a sleeve 122. This sleeve engages at its right-hand end (see Fig. 4a) with a ring 124 set in the left-hand end of sleeve 48, and at its left-hand end with a ring 126 set in the right-hand end of sleeve 12. Thus whenever sleeve 48 moves to the left under the action of the cam surface 114 operated by the emergency lever 66, it pushes sleeve 122 to the left and thereby pushes sleeve 12 to the left against the action of a coil spring 128. This then moves clutch member 44 away from clutch member 40 and disengages the coupling therebetween, thereby leaving arm 10 and rod 2 free to move regardless of the position of lever 30.

Connection is made between the sleeve 74 and the sleeve 18 by a spline arrangement (see Fig. 9) which also provides a support for the right-hand end of sleeve 74. The splined sleeve 132 is secured on sleeve 74 by a pin 134, and its splines engage with splines on the inside of sleeve 18. Thus turning of sleeve 74 will turn the sleeve 18, but the two sleeves are relatively slidable without movement of each other. The end of sleeve 18 as shown in Figs. 4a and 9 is mounted in a bearing 136 carried in bearing member 138 mounted on the angle members 26 and 28.

The other end of sleeve 74 is mounted for turning movement by a bearing 140 in a sleeve 142 which in turn is mounted by a bearing 144 in bearing member 80 secured to the angle members 26 and 28 (see Fig. 5). Sleeve 142 acts as a support for the opposite end of coil spring 128 acting on sleeve 12. Sleeve 142 is provided at its right-hand end (see Fig. 6) with projections 150 which provide between them on each side angular spaces of approximately 90°. Sleeve 12 also has projections 152 of approximately 30° extent which in the normal position of the parts shown extend into the spaces between projections 150 to a slight distance. It will be noted, however, that projections 152 are spaced from the surface of sleeve 74. Within the space so provided there are arranged projections 156, having the same angular extent as projections 152, of a sleeve 154 which is arranged within the sleeve 12 and is secured to sleeve 74 by a pin 158.

Sleeve 142 carries at its left-hand end a lever 160. This lever is connected to any suitable mechanism tending to move it by power in a counter-clockwise direction whenever the lever is free to move. In the form shown, and merely by way of example, the end of lever 160 is connected by a rod 162 pivoted thereto to the arm 164 of a bellcrank lever pivoted at 166 and having a second arm 168 connected to a tension spring 170 the other end of which is fixed at 172. It will be evident that this arrangement tends to move lever 160 in a counter-clockwise direction.

Movement of lever 160 is undesirable, however, unless both bomb-bay doors are open and at the same time the emergency control is operated. For this purpose, lever 160 is provided with a projecting nose 174 which engages shoulders such as 176 on three levers. Of these, levers 178 and 180 are mounted on the sleeves 86 and 104 respectively, the position of these sleeves being controlled by cables 96 and 108 so that the sleeves are turned only when the aft and forward bomb-bay doors are opened. Thus unless both of these doors are opened one of levers 178 and 180 will remain to block the movement of lever 160, and therefore to prevent the release of the bombs.

Mounted within the sleeve 104 by bearing 182 (Fig. 5) is a third sleeve 186. This sleeve extends into a bearing 188 in bearing member 72 (see Fig. 8). At its left-hand end, sleeve 186 carries a lever 190 generally similar to levers 178 and 180 and likewise engaging nose 174 of lever 160 to prevent movement thereof. At its other end, sleeve 186 carries a lever 192 rigid therewith. The free end of this lever has a pin 194 engaged in a slot 196 of links 198 pivoted at 200 to an arm 202 rigid with lever 66.

The operation of this emergency release mechanism is as follows:

When the emergency release is to be operated, the bombardier first opens the forward and aft bomb-bay doors. This through cables 96 and 108 moves levers 88 and 106, and simultaneously levers 178 and 180 so that only lever 190 holds the lever 160 against movement. Rod 68 is then pulled, and lever 66, 202 is turned in a counter-clockwise direction. The first effect of this is in the manner described above through cam surface 114 and projection 116 to shift sleeves 48 and 12 to the left thereby declutching levers 10 and 16, 22 from levers 30 and 46 respectively. During this movement, arm 202 moves links 198 upwardly until the bottoms of slots 196 have engaged pin 194. Further movement of the emergency rod now releases the lever 190, and thereby permits spring 170 to move lever 160 counter-clockwise in Fig. 2.

This movement of lever 160 turns sleeve 142. Projections 150 of lever 142 (see Fig. 6) moving in a counter-clockwise direction immediately engage projections 152 and 156, and impart a counter-clockwise movement to sleeve 12 and through pin 158 to sleeve 74. Sleeve 12 and lever 10 are then turned to a degree sufficient to move the bomb release control mechanism to salvo position, so that the bombs in the rear bomb-bay are dropped.

At the same time, sleeve 74 through splines 130 turns sleeve 18 and therethrough sleeve 24, thus turning levers 16 and 22 and setting the forward bomb control mechanism to salvo position to release the bombs in the forward bomb-bays.

Obviously the mechanism may be reset after operation, and will then be ready for further action.

While I have described herein some embodiments of my invention, I wish it to be understood that I do not intend to limit myself thereby except within the scope of the appended claims.

I claim:

1. In a bomb bay door and bomb release control mechanism having a bomb release control member, means cooperating with said bomb release control member to move said member between locked and operative positions, means to move said bomb bay door, means responsive to bomb-bay door movement, means cooperating with said first means to lock said first means in a position for locking the control member, said last means cooperating with and being movable by said bomb-bay door responsive means to a position releasing said first means for movement of said control member to the operative position.

2. In a bomb bay door and bomb release control mechanism having a bomb release control member, means cooperating with said control member turnable to move said control member between locked and operative positions, means to move said bomb bay door, means responsive to bomb-bay door movement, means cooperating with said first means to lock said first means against turning in a position for locking the control member, said last means cooperating with and movable by said bomb-bay door responsive means to a position releasing said first means for movement of said control member to the operative position when said bomb-bay door responsive means is in a position corresponding to opening of a bomb-bay door.

3. In combination in a bomb bay door and bomb release mechanism, a main shaft mechanism comprising a rotatable sleeve having a lever connected thereto, means cooperating with said lever for manually moving said lever to turn said sleeve, a second coaxial sleeve rotatable with respect to said first sleeve, a lever connected to said second sleeve and adapted to be connected to the bomb release mechanism, a releasable coupling connection between said first and second sleeves, a third coaxial sleeve turnable with respect to said first and second sleeves, said second sleeve being slidable with respect to said first sleeve, a lost motion coupling connection between said second and third sleeves, means cooperating with said first sleeve to lock said first sleeve against turning movement, two means cooperating with said third sleeve to lock said third sleeve against turning movement, means responsive to the position of a bomb bay door for releasing said means locking said first sleeve and one of the means locking said third sleeve, manual emergency means cooperating with said second sleeve to move said second sleeve longitudinally to disengage said first coupling means, for thereafter releasing said second locking means from said third sleeve, and for turning said third sleeve when the locking means therefor are released thereby imparting movement to said second sleeve through said second coupling means.

4. In combination in a bomb bay door and bomb release mechanism, a main shaft mechanism comprising a rotatable sleeve having a lever connected thereto, means cooperating with said lever for manually moving said lever to turn said sleeve, a second coaxial sleeve rotatable with respect to said first sleeve, a lever connected to said second sleeve and adapted to be connected to the bomb release mechanism, a releasable coupling connection between said first and second sleeves, a third coaxial sleeve turnable with respect to said first and second sleeves, said second sleeve being slidable with respect to said first sleeve, a lost motion coupling connection between said second and third sleeves, means cooperating with said first sleeve to lock said first sleeve against turning movement, two means cooperating with said third sleeve to lock said third sleeve against turning movement, means responsive to the position of a bomb bay door for releasing said means locking said first sleeve and one of the means locking said third sleeve, a fourth coaxial sleeve turnable with respect to said first sleeve, a manual emergency lever connected to said fourth sleeve, means cooperating with said second and fourth sleeves operated by turning of said fourth sleeve to move said second sleeve longitudinally to disengage said first coupling means, means connected to said emergency lever cooperating with said second locking means for thereafter releasing said second locking means for said third sleeve, and power means cooperating with said third sleeve for automatically turning said third sleeve when the locking means therefor are released thereby imparting movement to said second sleeve through said second coupling means.

5. In combination in a bomb bay door and bomb release mechanism, a main shaft mechanism comprising a rotatable sleeve, a second sleeve turnable with respect to said first sleeve and having a lever connected thereto, means for manually moving said lever to turn said second sleeve, a third sleeve rotatable with respect to said first sleeve, a lever connected to said third sleeve and adapted to be connected to the bomb release mechanism, a releasable coupling connection between said second and third sleeves, a fourth coaxial sleeve turnable with respect to said first sleeve, said first and third sleeves being slidable with respect to said second sleeve, a lost motion coupling connection between said third and fourth sleeves, means cooperating with said second sleeve to lock said second sleeve against turning movement, two means cooperating with said fourth to lock said fourth sleeve against turning movement, means responsive to the position of a bomb bay door for releasing said means locking said second sleeve and one of the means locking said fourth sleeve, a fifth coaxial sleeve turnable with respect to said first sleeve, means operated by turning of said fifth sleeve to move said first sleeve longitudinally, means to impart this longitudinal movement of said first sleeve to said third sleeve to disengage said first coupling means, means connected to said emergency lever cooperating with said second locking means for thereafter releasing said second locking means for said fourth sleeve, and power means cooperating with said fourth sleeve for automatically turning said fourth sleeve when the locking means therefor are released thereby imparting movement to said third sleeve through said second coupling means.

6. Apparatus as claimed in claim 5, in which said means for moving said first sleeve longitudinally comprises a cooperating cam surface and lug on said first and fifth sleeves.

7. In combination in a bomb bay door and bomb release mechanism, a main shaft mechanism comprising a sleeve, a second sleeve turnable on said first sleeve and having a lever connected thereto, means cooperating with said lever for manually moving said lever to turn said second sleeve, a third sleeve rotatable on said first sleeve, a lever connected to said third sleeve and adapted to be connected to the bomb release mechanism, a releasable coupling connection between said second and third sleeves, a fourth sleeve turnable on said first sleeve, said first sleeve being slidable within said fourth sleeve, a lost motion coupling connection between said third and fourth sleeves, means cooperating with said second sleeve to lock said second sleeve against turning movement, two means cooperating with said fourth sleeve to lock said fourth sleeve against turning movement, means responsive to the position of a bomb bay door for releasing said means locking said second sleeve and one of the means locking said fourth sleeve, a fifth sleeve mounted around said first sleeve, a manual emergency lever connected to said fifth sleeve, means cooperating with said third and fifth sleeves operated by turning of said fifth sleeve to move said third sleeve longitudinally to disengage said first coupling means, means connected to said emergency lever cooperating with said second locking means for thereafter releasing said second locking means for said fourth sleeve when the locking means cooperating with said fourth sleeve therefor are released thereby imparting movement to said third sleeve through said second coupling means.

8. In a bomb bay door and bomb release control mechanism, a main shaft mechanism comprising a sleeve having a lever adapted to be connected to the bomb release mechanism, a second coaxial sleeve turnable and slidable with respect to said first sleeve, a manual control lever connected to said second sleeve, a coupling connection between said first and second sleeves, a third coaxial sleeve mounted to turn with respect to said second sleeve, said second and third sleeves having means thereon for moving said second sleeve longitudinally with respect to said third sleeve upon turning of said third sleeve, said longitudinal movement of said third sleeve releasing said coupling connection, an emergency lever connected to said third sleeve for turning the same, a fourth coaxial sleeve mounted to turn with respect to said second sleeve, a lost motion coupling connection between said first sleeve and said fourth sleeve, means cooperating with said second and fourth sleeves normally locking said second sleeve and said fourth sleeve and a second means normally locking said fourth sleeve, means cooperating with said first locking means responsive to bomb-bay door opening for releasing said first locking means, means cooperating with said third sleeve responsive to movement of said third sleeve to release said second locking means, and power means cooperating with said fourth sleeve for turning said fourth sleeve when both said locking means are released, said fourth sleeve turning said first sleeve through said lost motion coupling.

9. In a bomb bay door bomb release control mechanism, a main shaft mechanism comprising a first sleeve, a second sleeve splined on said first sleeve, said second sleeve having a lever adapted to be connected to the bomb release mechanism, a third sleeve turnable on said first sleeve, a manual control lever connected to said third sleeve, a coupling connection between said second and third sleeves, a fourth sleeve mounted to turn around said third sleeve, said third and fourth sleeves having cooperating cam means thereon for moving said third sleeve longitudinally with respect to said fourth sleeve upon turning of said fourth sleeve, said longitudinal movement of said third sleeve releasing said coupling connection, an emergency lever connected to said fourth sleeve for turning the same, a fifth sleeve mounted on said first sleeve and turnable thereon, said first sleeve being slidable longitudinally in said fifth sleeve, a lost motion coupling connection between said first sleeve and said fifth sleeve, means cooperating with said third and fifth sleeves normally locking said third sleeve and said fifth sleeve, means cooperating with said fifth sleeve responsive to bomb-bay door opening for releasing said first locking means cooperating with said fourth sleeve and second locking means, means responsive to movement of said fourth sleeve to release said second locking means, and power means cooperating with said fifth sleeve for turning said fifth sleeve when both said locking means are released, means cooperating with said fifth sleeve for turning said first sleeve and said second sleeve splined on said first sleeve.

10. In combination in a bomb bay door and bomb release mechanism, a main shaft mechanism comprising a sleeve, a second sleeve turnable on said first sleeve and having a lever connected thereon, means cooperating with said lever for manually moving said lever to turn said second sleeve, a third sleeve rotatable and slidable on said first sleeve, a lever connected to said third sleeve and adapted to be connected to the bomb release mechanism, a releasable coupling connection between said second and third sleeves, a fourth sleeve turnable on said first sleeve, said first sleeve being slidable within said fourth sleeve, a lost motion coupling connection between said first and third sleeves and said fourth sleeve, a fifth sleeve splined on said first sleeve, said fifth sleeve having a lever adapted to be connected to bomb release mechanism, a sixth sleeve turnable and slidable on said first sleeve, a manual control lever connected to said sixth sleeve, a third coupling connection between said fifth and sixth sleeves, means cooperating with said second and sixth sleeves to lock said second and sixth sleeves against turning movement, three means cooperating with said fourth sleeve to lock said fourth sleeve against turning movement, means responsive to the position of a bomb bay door to release each of said means locking said second and sixth sleeves and one of the means locking said fourth sleeve, a seventh sleeve mounted to turn around said sixth sleeve, said sixth and seventh sleeves having cooperating cam means thereon for moving said sixth sleeve longitudinally with respect to said seventh sleeve upon turning of said seventh sleeve, an emergency lever connected to said seventh sleeve for turning the same, means cooperating with said third and sixth sleeves to impart this longitudinal movement of said sixth sleeve to said third sleeve, so as to disengage both said first and third coupling connections, means connected to said emergency lever cooperating with said third locking means for thereafter releasing the third locking means for said fourth sleeve, and power means cooperating with said fourth sleeve for automatically turning said fourth sleeve when the locking means therefor are released to impart movement to said third and fifth sleeves through said second coupling means.

GEORGE F. TOWNER.